March 14, 1950
C. A. BLOOM
2,500,656
REMOTELY OPERABLE MEANS FOR FOCUSING PHOTOGRAPHIC ENLARGERS
Filed June 13, 1946
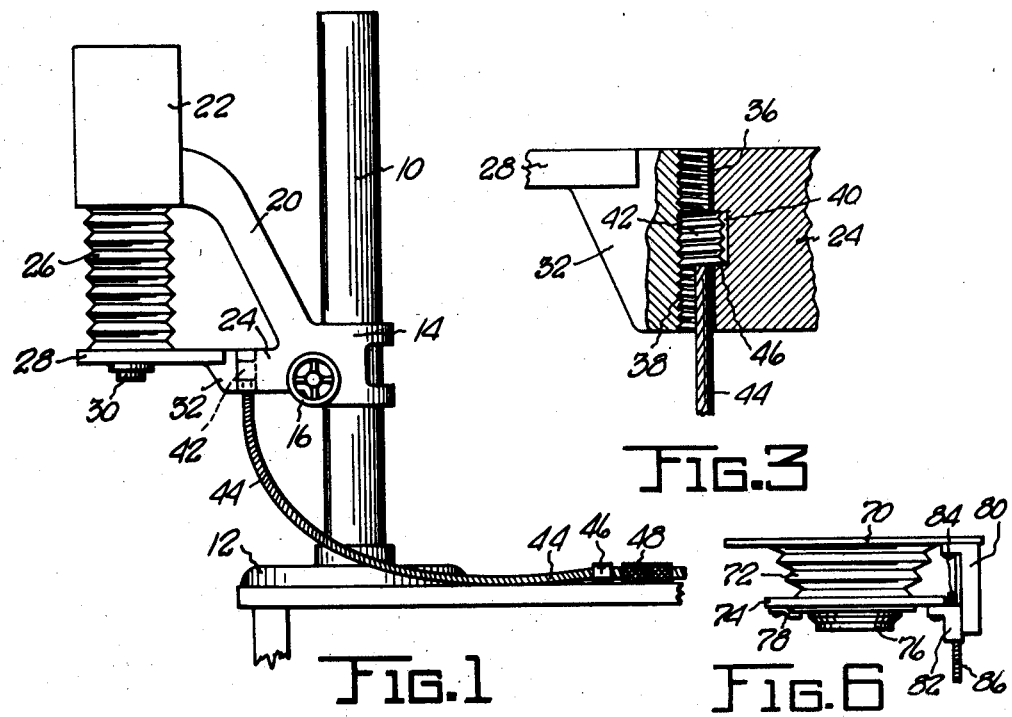
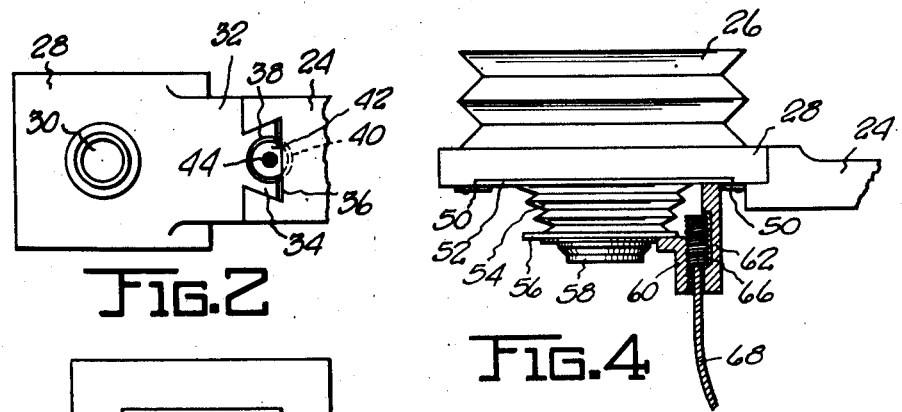
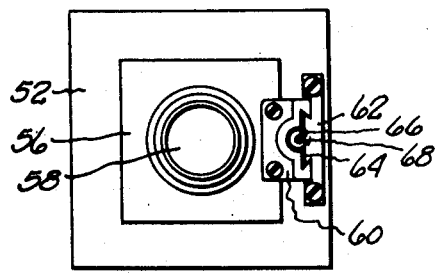
CECIL A. BLOOM.
INVENTOR
BY Oltsch & Knoblock
ATTORNEYS.

Patented Mar. 14, 1950

2,500,656

UNITED STATES PATENT OFFICE 2,500,656

REMOTELY OPERABLE MEANS FOR FOCUSING PHOTOGRAPHIC ENLARGERS

Cecil A. Bloom, South Bend, Ind.

Application June 13, 1946, Serial No. 676,422

8 Claims. (Cl. 88—24)

1

This invention relates to improvements in photographic enlargers.

Heretofore many different types and constructions of photographic enlargers have been made for use by professional and amateur photographers. These devices have been provided with different adjusting mechanisms which afford the requisite manipulation of the device to accurately regulate the device for photographic enlargement within a wide range. Such adjusting mechanisms have been satisfactory and practical in cases where the enlargement desired has been in the lower part of the range of the device. However, all prior adjusting mechanisms have been subject to limitations preventing satisfactory use thereof in making enlargements at the upper part of the range of the enlarger, i. e., those of the largest size. Such enlargements require maximum spacing between the lens of the enlarger and the position of the printing paper to be printed. A common practice in making such enlargements is to mount the enlarger upon a support or table in an elevated position and adjust the enlarger at or near to its uppermost adjustable position, so that the lens and associated parts are located near ceiling level.

The easel mounting the printing paper is supported at or near floor level. Consequently, when the enlarger is being focused, preparatory to use, the spacing of the lens from the film is too great to permit the photographer to reach and manipulate the mechanism for adjusting the focus and at the same time observe with desired visual acuity the focus of the projected light image upon the object, such as an easel or a paper holder. This necessitates adjustment of the enlarger and careful observation of the effect of that adjustment alternately until the proper focus is obtained. Obviously this is an inconvenient, awkward and laborious procedure.

The primary object of this invention is to provide a device which overcomes the aforementioned limitations and disadvantages by permitting adjustment of the enlarger from a location remote therefrom.

A further object is to provide an enlarger with a focus adjusting means accurately actuable by an elongated flexible shaft.

A further object is to provide a unitary adjustable lens mount with elongated actuating means and which is adapted to be mounted as a unit upon an enlarger.

A further object is to provide an enlarger with means for adjusting the focus thereof characterized by simplicity and low cost, ease of operation

2 at any position within a wide area remote from the enlarger, and a high degree of accuracy.

Other objects will be apparent from the following description.

In the drawing:

Fig. 1 is a side view of the enlarger.

Fig. 2 is an enlarged fragmentary bottom view of the lens holder and lens adjusting means of the enlarger.

Fig. 3 is an enlarged detail side view of the lens adjusting means, with parts shown in longitudinal vertical section.

Fig. 4 is a fragmentary side view of an enlarger, illustrating a modified embodiment of the invention.

Fig. 5 is a bottom view of the construction shown in Fig. 4.

Fig. 6 is a side view of another embodiment of the invention.

Referring to the drawing, and particularly to Figs. 1 to 3, inclusive, which illustrate one embodiment of the invention, the numeral 10 designates an elongated rigid upright or standard which is supported by a large base 12. A slide or carrier 14 is adjustably mounted upon the standard and is provided with adjusting means actuable by hand wheel 16 and of any suitable construction for varying or regulating the vertical position of the carriage upon the standard. A rigid arm 20 projects upwardly and outwardly from the carrier 14 and supports a housing 22 for a source of illumination (not shown). The housing 22 is spaced laterally from the standard a distance greater than the extent of lateral projection of base 12 from standard 10. A second rigid arm 24 projects laterally from the carrier 14 below and substantially in the same vertical plane as the arm 20. A bellows 26 is connected to the bottom of the housing 22 at its upper end and to a film holder 28 at its lower end. The film holder mounts a lens unit 30 of any suitable construction.

The film holder 28 is secured to a fitting 32 which has a vertical dovetail tongue 34 at its end face for a guided sliding fully supported fit in a dovetail slot 36 formed in the outer end of the arm 21. The fitting 32 has a vertical groove 38 formed in the outer end surface of the tongue 34 thereof, which is of arcuate cross-sectional shape preferably slightly more than 180° in extent and is screw threaded. A recess 40 is formed in the end face of arm 24 at the base of the groove 36 and intermediate the ends of the groove. Recess 40 is arcuate and complementary to groove 38, and is of a radius at least equal to and preferably slightly greater than the diameter of groove 38 measured at the base of the thread grooves. An externally screw threaded member 42 fits in the recess 40 with its threads meshing with the threads of groove 38. The member 42 is of a length to fit freely and rotatably in recess 40, and without substantial end play as is customary and well understood in the manufacture of half-nut mechanisms. The member 42 has secured thereto, axially at one end thereof, an elongated flexible shaft 44, as of the coiled wire type preferably consisting of multiple elongated coils wound oppositely and one around the other. If desired, a collar 46 is mounted slidably upon the shaft 44, and a second collar 48, preferably knurled, is clamped upon the shaft 44 at any selected adjustment, and is positioned outwardly relative to collar 46.

Apart from the means described for mounting and adjusting the film holder and lens, all other parts of the enlarger may be of any suitable or conventional construction, and it is intended that the structure described and shown shall be considered to be illustrative only and not limiting.

To use the device, assuming that the enlarger has been located properly, that the easel (not shown) is positioned in register with the lens unit 30, and that the hand wheel 16 has been manipulated to proper elevation, it is necessary only to rotate the flexible shaft 44 to obtain the final adjustment for the sharpness of focus which is desired. The shaft 44 may be of any length found necessary or desirable, so that by holding the collar 46 in one hand as a guide and grasping and turning the handle collar 48 with the other hand, a photographer who has assumed a position which enables him to critically observe the focus of the enlarger upon the easel (not shown) may accurately focus the enlarger. As the shaft 44 is rotated, it rotates member 42 therewith and thereby raises or lowers the fitting 32 and the film holder 28. The support of fitting 32 is transmitted by the member 42 which bears upon the shoulder 46 at the lower end of the recess 40, to the arm 24. Inasmuch as the adjustment of fitting 32 is effected by interengaging screw threaded parts, it is accomplished with micrometric accuracy, and small increments of adjustment for utmost clarity and sharpness of focus are easily obtained. A further advantage of the device resides in the flexibility of the shaft 44, which permits adjustment to be made without regard to the location of the photographer or the posture he assumes while studying or observing the focus. Likewise, the flexibility of the shaft prevents its length from rendering it cumbersome or awkward to handle, and permits the coiling of the shaft into small compass for purposes of storage and handling. Still another advantage is that it permits a sufficiently high degree of accuracy of focusing to be accomplished quickly to insure the highest quality of photographic reproduction in greatly enlarged size without danger of spoilage and consequent loss which would be expensive because of the large size of the photographic print produced.

While the construction described above contemplates the use of the adjusting device as an integral part of an enlarger incorporated therein during manufacture, it is possible to produce the adjusting mechanism in a form which is applicable as a unit to any prefabricated or existing enlarger. A construction of this type is illustrated in Figs. 4 and 5. In this connection, it is customary to provide detachable means for mounting a lens unit 30 upon the film holder 28. Thus means 50 are commonly provided to position and support a plate 52 at the bottom surface of the film holder 28. In the construction of a regulating attachment unit I make use of a plate 52 of the same size and shape as the lens mounting plate for insertion and support in the same manner. A small bellows 54 is connected at one end to the bottom face of the plate 52 and at its opposite end to a second and smaller plate 56 which mounts the lens unit 58. The plate 56 is supported by a fitting 60. A bracket 62 is secured to the plate 52 and depends therefrom in laterally spaced relation to the bellows 54 and the small plate 56. The bracket 62 and fitting 60 have an interfitting dovetailed tongue and groove sliding connection 64 and the fitting has a vertical threaded groove of arcuate cross-section to constitute it a half-nut. The bracket 62 is recessed at the parting plane or face of the assembled unit to rotatably receive a threaded member 66 which meshes with the threads of the half-nut. An elongated flexible shaft 68 is fixedly secured to the member 66 and serves to actuate said member as described above.

The attachment unit of Figs. 4 and 5 therefore provides all of the advantages outlined above, and the additional advantage of permitting application to a conventional enlarger to convert the same to obtain the advantage of remote control of focus.

Another embodiment of the invention having the same purposes and advantages of the device of Figs. 4 and 5 is shown in Fig. 6. This device constitutes a separate adjustable light shield unit having an upper plate 70 adapted for attachment to the film holder, a flexible bellows 72 and a bottom plate 74 to which a standard lens unit 76 is adapted to be detachably connected, as by securing means 78. Cooperating guide parts 80 on plate 70 and 82 on plate 74 have a vertical dovetail tongue and groove slide joint. Part 82 constitutes a half-nut receiving the threaded member 84 to which is connected the flexible operating shaft 86. The advantage of this construction is that it permits the use of the regular lens unit of the enlarger.

While two embodiments of the invention have been described and illustrated, it is contemplated that the device may take other forms within the scope of the claims and the spirit of the invention.

I claim:

1. In a photographic enlarger, a supporting member, lens mounting means including a supported member having a dovetailed tongue and groove sliding connection with said supporting member, one of said members having a vertical screw threaded groove in its parting face extending the full length of said connection and the other member having a recess in its parting face positioned intermediate the ends thereof and complementary to said groove, a threaded member of substantially the same length as said recess fitting rotatably in and retained by said recess and meshing with the threads of said groove, and an elongated flexible shaft secured to said threaded member and projecting freely through said groove to terminate spaced from said members.

2. In a photographic apparatus, means for focusing a lens comprising a supporting element, a shiftable element adapted to mount a lens unit, means for slidably interlocking and guiding said shiftable element on said supporting element and having confronting faces, one of said elements constituting a half-nut open at its face for its full longitudinal extent, the other element having a comparatively short recess open at its face, a screw threaded member of substantially the same length as said recess retained therein for rotation and meshing with said half-nut, said threaded member holding said shiftable element in selected adjustment relative to said supporting element.

3. In a photographic apparatus, means for focusing a lens comprising a supporting element, a shiftable element adapted to mount a lens unit, means for slidably interlocking and guiding said shiftable element on said supporting element and having confronting faces, one of said elements constituting a half-nut open at its face for its full longitudinal extent, the other element having a comparatively short recess open at its face, a screw threaded member of the same length as said recess and retained therein for rotation and meshing with said half-nut, said threaded member holding said shiftable element in selected adjustment relative to said supporting element, and means for rotating said threaded member projecting longitudinally through said half-nut and elongated to extend to a position spaced from said lens unit beyond arm's reach.

4. The combination with a photographic enlarger having a film holder adapted to detachably support a lens mount, of a lens unit comprising a plate adapted to be secured to said film holder, a bracket depending from a marginal portion of said plate, a bellows depending from said plate, a lens mounting plate secured to the lower end of said bellows, cooperating interengaging guides carried by said bracket and lens plate, a rotatable threaded member carried by one guide in predetermined position and having screw threaded engagement with the other guide for shifting said lens plate upon rotation thereof, and an elongated flexible shaft connected to and adapted to rotate said member.

5. A lens carrying attachment adapted for connection with the film holder of a photographic enlarger, comprising a mounting panel, a lens-carrying plate, an extensible light shield connecting said plate and panel, slidably interengaging guides carried by said plate and panel, respectively, plate adjusting means cooperating with said guides and including a rotatable actuating element carried by one guide in predetermined position and meshing with the other guide, and a flexible shaft axially secured at one end to said actuating element.

6. A lens carrying attachment adapted for connection with the film holder of a photographic enlarger, comprising a mounting panel, a lens-carrying plate, an extensible light shield connecting said plate and panel, slidably interengaging guides carried by said plate and panel, respectively, one of said guides having longitudinal full-length groove of arcuate cross-section and screw threaded contour, a screw threaded member journaled in predetermined longitudinal position by the other guide and meshing with the threaded groove, and a flexible shaft extending through said groove and axially secured to said threaded member.

7. In a photographic enlarger, a supporting member, lens mounting means including a supported member interlocked with and slidable in a predetermined path relative to said supporting member, one of said members having a comparatively short recess, a screw threaded part seated in said recess against endwise movement and rotatable, the other member having a full-length screw threaded recessed surface with which said threaded part meshes, and a flexible shaft fixedly secured to said threaded part and having an elongated portion projecting through said threaded recess and beyond said members, a hand grip fixed on the free end of said shaft, and a collar rotatably encircling said shaft between said grip and said members.

8. A lens unit adapted to be mounted upon a photographic enlarger having a film holder and means to detachably support a lens unit, comprising a plate adapted to be secured by said means to said film holder in face engagement with said holder, a bracket projecting perpendicularly from a marginal portion of said plate, a bellows secured at one end to said plate, a lens-mounting plate secured to the other end of said bellows substantially parallel to said first plate, said bracket plate having a dovetailed tongue and groove connection for guiding movement of said lens plate relative to said bracket, said tongued part having an elongated semi-cylindrical screw-threaded groove and said grooved part having a semi-cylindrical socket intermediate its ends, a screw-threaded member seated in said socket and meshing with the threads of the threaded groove for shifting said lens plate, and an elongated flexible rotatable shaft secured to said last named member and extending through said threaded groove to a position beyond arm's reach relative to said lens plate.

CECIL A. BLOOM.

REFERENCES CITED

The following references are of record in the file of this patent:

UNITED STATES PATENTS

| Number | Name | Date |
| --- | --- | --- |
| 584,182 | Linley | June 8, 1897 |
| 1,552,817 | Boedicker | Sept. 8, 1925 |
| 1,950,166 | Durholz | Mar. 6, 1934 |
| 2,356,960 | Wekeman | Aug. 29, 1944 |
| 2,383,161 | Pratt | Aug. 21, 1945 |

FOREIGN PATENTS

| Number | Country | Date |
| --- | --- | --- |
| 500,873 | Germany | June 25, 1930 |